US010990407B2

(12) United States Patent
 Waskiewicz, Jr.

(10) Patent No.: US 10,990,407 B2
(45) Date of Patent: Apr. 27, 2021

(54) DYNAMIC INTERRUPT RECONFIGURATION FOR EFFECTIVE POWER MANAGEMENT

(75) Inventor: Peter P. Waskiewicz, Jr., Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1292 days.

(21) Appl. No.: 13/977,605

(22) PCT Filed: Apr. 24, 2012

(86) PCT No.: PCT/US2012/034814
§ 371 (c)(1),
(2), (4) Date: Jun. 28, 2013

(87) PCT Pub. No.: WO2013/162523
PCT Pub. Date: Oct. 31, 2013

(65) Prior Publication Data
US 2013/0318334 A1 Nov. 28, 2013

(51) Int. Cl.
*G06F 9/38* (2018.01)
*G06F 13/24* (2006.01)
(Continued)

(52) U.S. Cl.
CPC .......... *G06F 9/3861* (2013.01); *G06F 1/3203* (2013.01); *G06F 1/329* (2013.01);
(Continued)

(58) Field of Classification Search
CPC ........ G06F 13/24; G06F 1/3203; G06F 1/329; G06F 9/5083
(Continued)

(56) References Cited

U.S. PATENT DOCUMENTS 6,237,058 B1 * 5/2001 Nakagawa ............. G06F 13/24
   710/260
6,631,422 B1 * 10/2003 Althaus .................. H04L 67/00
   709/230
(Continued)

FOREIGN PATENT DOCUMENTS

CN 101639726 A 2/2010
CN 101794238 A 8/2010
(Continued)

OTHER PUBLICATIONS

International Preliminary Report on Patentability and Written Opinion received for PCT Patent Application No. PCT/US2012/034814, dated Nov. 6, 2014, 7 pages.
(Continued)

*Primary Examiner* — Brian T Misiura
(74) *Attorney, Agent, or Firm* — Compass IP Law PC

(57) ABSTRACT

Methods, apparatus, and systems for facilitating effective power management through dynamic reconfiguration of interrupts. Interrupt vectors are mapped to various processor cores in a multi-core processor, and interrupt workloads on the processor cores are monitored. When an interrupt workload for a given processor core is detected to fall below a threshold, the interrupt vectors are dynamically reconfigured by remapping interrupt vectors that are currently mapped to the processor core to at least one other processor core, such that there are no interrupt vectors mapped to the processor core after reconfiguration. The core is then enabled to be put in a deeper idle state. Similar operations can be applied to additional processor cores, effecting a collapsing of interrupt vectors onto fewer processor cores. In response to detecting cores emerging from idle states, reconfiguration of interrupt vectors can be performed to rebalance the assignment of the
(Continued)

vectors across active cores by remapping a portion of the vectors to those cores.

29 Claims, 6 Drawing Sheets

(51) Int. Cl.
    *G06F 1/3203*     (2019.01)
    *G06F 1/329*     (2019.01)
    *G06F 9/48*     (2006.01)

(52) U.S. Cl.
    CPC ............ *G06F 9/4812* (2013.01); *G06F 13/24* (2013.01); *Y02D 10/00* (2018.01)

(58) Field of Classification Search
    USPC .......................................... 710/260; 713/323
    See application file for complete search history.

(56) References Cited

U.S. PATENT DOCUMENTS

| | | | |
|---|---|---|---|
| 6,711,643 B2* | 3/2004 | Park ......................... | G06F 13/24 710/260 |
| 6,813,665 B2* | 11/2004 | Rankin ..................... | G06F 13/24 710/260 |
| 7,581,052 B1* | 8/2009 | Solomita ............... | G06F 9/4812 710/260 |
| 7,873,770 B2* | 1/2011 | Hummel ............. | G06F 12/1081 710/260 |
| 7,962,679 B2* | 6/2011 | van de Ven ............. | G06F 13/24 710/261 |
| 8,112,648 B2* | 2/2012 | Branover .............. | G06F 1/3203 713/320 |
| 8,312,175 B2* | 11/2012 | Patale .................... | G06F 9/5011 709/223 |
| 8,479,026 B2* | 7/2013 | Lakshmanan ......... | G06F 1/3203 702/182 |
| 8,601,194 B2* | 12/2013 | Tsirkin .................... | G06F 13/24 710/260 |
| 8,688,883 B2* | 4/2014 | Guddeti .................. | G06F 13/24 710/260 |
| 8,762,994 B2* | 6/2014 | Saripalli ............... | G06F 9/4812 710/260 |
| 8,892,916 B2* | 11/2014 | Bieswanger .......... | G06F 1/3203 713/300 |
| 9,032,127 B2* | 5/2015 | Fischer ................... | G06F 13/24 710/260 |
| 9,069,555 B2* | 6/2015 | Fetzer ..................... | G06F 1/324 |
| 9,207,994 B2* | 12/2015 | Seshadri ............... | G06F 9/5094 |
| 2006/0212677 A1 | 9/2006 | Fossum | |
| 2008/0162762 A1 | 7/2008 | Neiger et al. | |
| 2009/0089470 A1* | 4/2009 | Ven ......................... | G06F 13/24 710/260 |
| 2009/0172423 A1* | 7/2009 | Song ..................... | G06F 1/3203 713/300 |
| 2009/0320031 A1* | 12/2009 | Song ..................... | G06F 9/5094 718/102 |
| 2010/0274939 A1 | 10/2010 | Egger et al. | |
| 2011/0145461 A1* | 6/2011 | Zhao .................... | G06F 9/4812 710/267 |
| 2012/0166764 A1 | 6/2012 | Henry et al. | |
| 2014/0372649 A1* | 12/2014 | Raffman .............. | G06F 9/5083 710/260 |

FOREIGN PATENT DOCUMENTS

| | | |
|---|---|---|
| JP | 2010-061644 A | 3/2010 |
| WO | 2012/014285 A1 | 2/2012 |
| WO | 2012/027074 A1 | 3/2012 |
| WO | 2013/162523 A1 | 10/2013 |

OTHER PUBLICATIONS

International Search Report and Written Opinion received for PCT Application No. PCT/US2012/034814, dated Dec. 12, 2012, 10 pages.

Office Action received for Japanese Patent Application No. 2015-501653, dated Oct. 6, 2015, 10 pages of English Translation and 13 pages of Japanese Office Action.

Office Action received for Japanese Patent Application No. 2015-501653, dated Feb. 16, 2016, 2 pages of English Translation and 3 pages of Japanese Office Action.

Office Action and Search Report received for Chinese Patent Application No. 201280071863.7, dated Feb. 14, 2017, 9 pages of Chinese Office Action, and 5 pages of English translation.

* cited by examiner

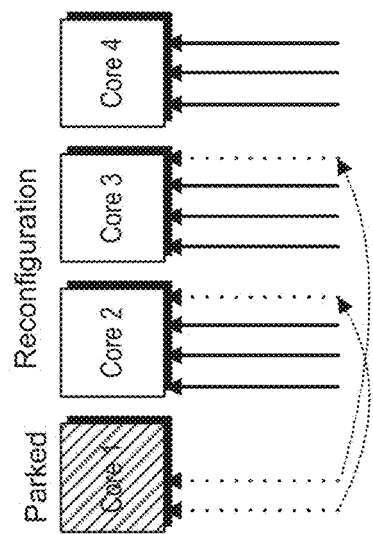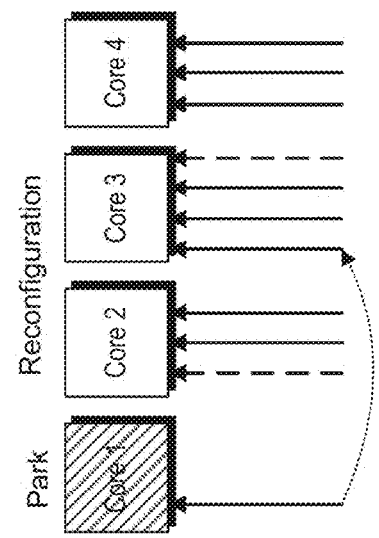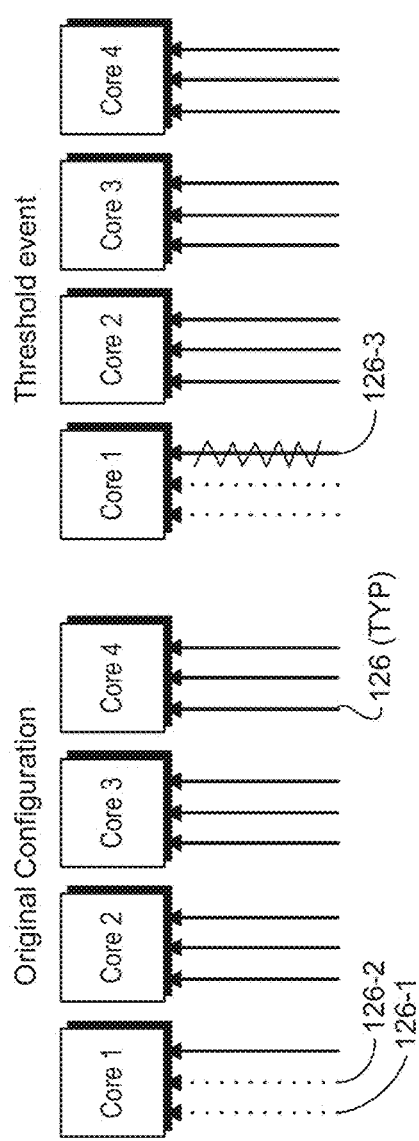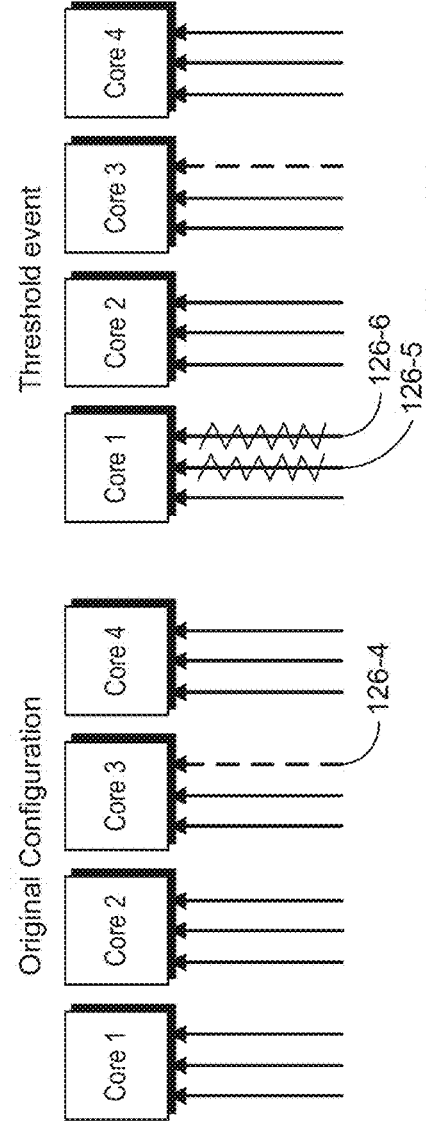

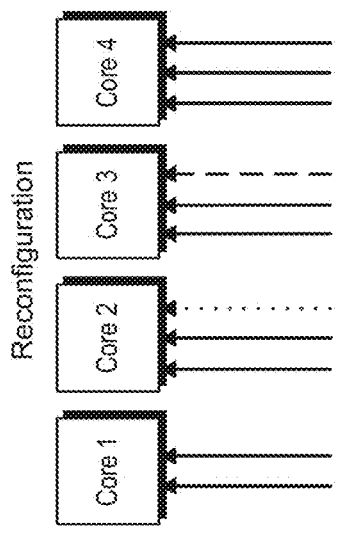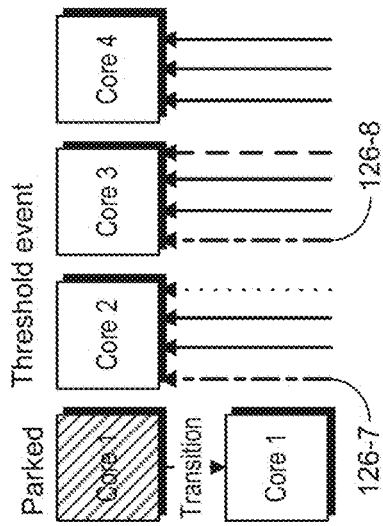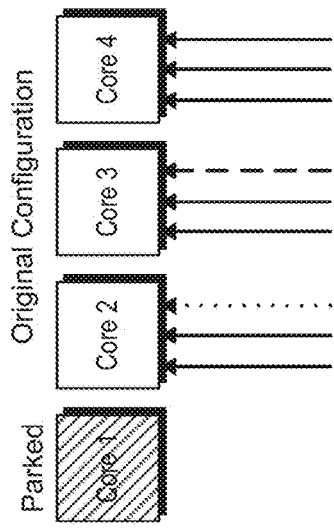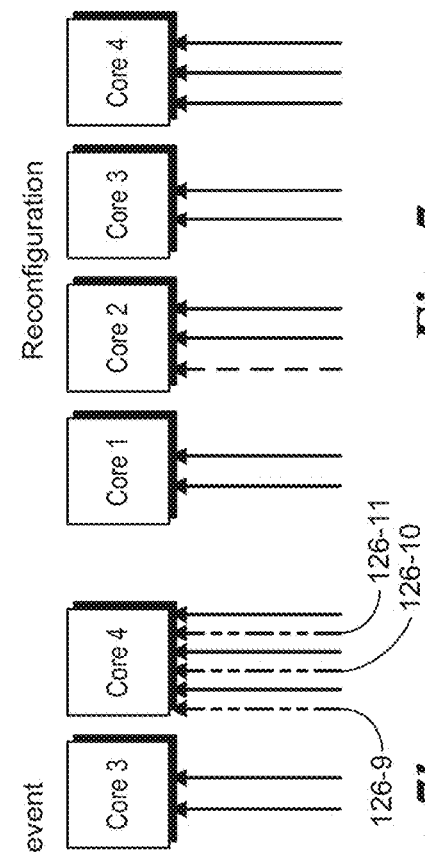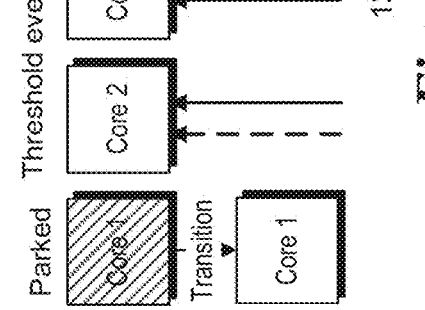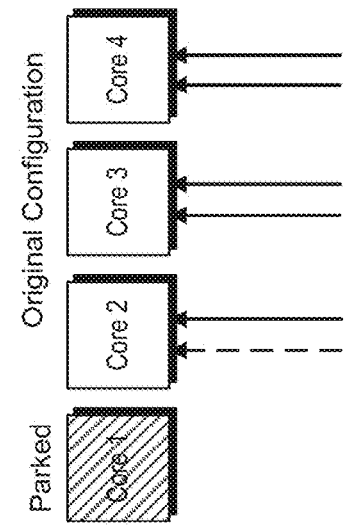

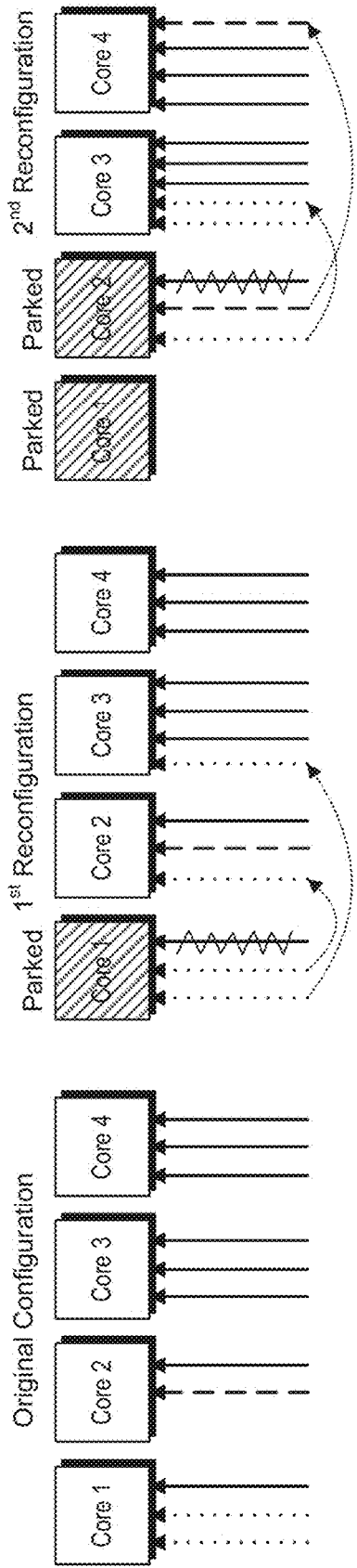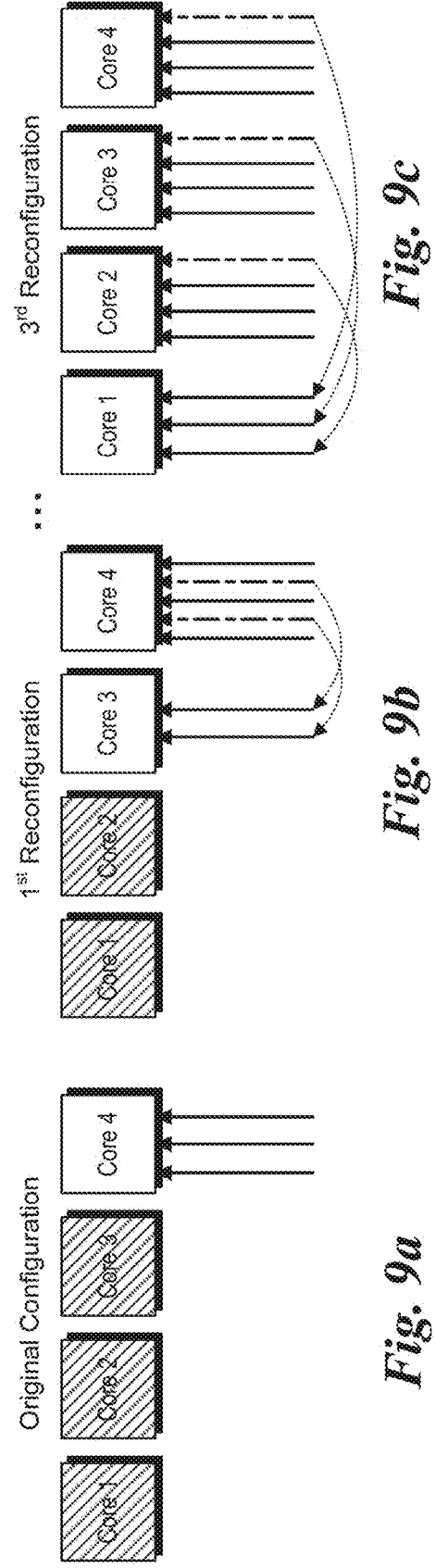
Fig. 8a Fig. 8b Fig. 8c
Fig. 9a Fig. 9b Fig. 9c

DYNAMIC INTERRUPT RECONFIGURATION FOR EFFECTIVE POWER MANAGEMENT

TECHNICAL FIELD

The field of invention relates generally to computer systems and, more specifically but not exclusively relates to reducing power consumption in multi-core processors.

BACKGROUND ART

An interrupt is a hardware signal from a device to a CPU (Central Processing Unit, i.e., processor), informing the CPU that the device needs attention and signaling that the CPU should stop current processing and respond to the device. If the CPU is performing a task that has lower priority than the priority of the interrupt, the CPU suspends its current thread. The CPU then invokes the interrupt handler for the device that sent the interrupt signal. The interrupt handler services the device, and when the interrupt handler returns, the CPU resumes the processing it was doing before the interrupt occurred.

Interrupts in old bus technologies are referred to as "legacy" or "line-based" interrupts. With these technologies, interrupts are signaled by using one or more external pins that are wired separately from the main lines of the bus, a process known as "out of band." Newer bus technologies, such as PCIe (Peripheral Component interconnect Express), maintain software compatibility by emulating legacy interrupts through in-band mechanisms. These emulated interrupts are treated as legacy interrupts by the host operating system. Line-based interrupts as defined by the PCI standard were limited to only four lines and due to multiple devices were often shared causing increased latencies.

The PCI 2.2 specification introduced MSI (Message-Signaled Interrupt) as an alternative to traditional line-based interrupts. Instead of using a dedicated pin to trigger interrupts, MSI enables devices to trigger an interrupt by writing a specific value to a particular address. The message destination address and message data are referred to as the MSI "vector." PCI 3.0 defines an extended form of MSI, called MSI-X, which addresses limiting features of MSI. For example, while MSI has a limit of 32 MSI messages per adapter function, MSI-X increases the number of messages to 2,048. Another example is that MSI provides only a single MSI address value such that all messages are targeted at the same group of processors. MSI-X overcomes this issue by providing a unique address and data pair for each message.

The Advanced Programmable Interrupt Controller (APIC) was introduced by Intel® in 1997, and was originally targeted to management of interrupts in systems employing symmetric multi processor (SMP) architectures. Microsoft observed the benefits of APIC on SMP systems, and designed support for APIC on uni-processor systems into its operating systems. Today, APICs are employed in substantially all x86-based computers, either as a component internal to a CPU and/or in an external IO chip.

Power management is a feature of electrical devices, including computers, which attempts to "turn off" or place certain or all portions of the device in some lower-power state when inactivity is present, Managing the energy consumed by a microprocessor prolongs battery life, reduces cooling requirements, reduces electrical noise, and reduces operating costs. Since mobile computing is becoming more ubiquitous, power management is becoming more important in mobile electrical devices such as laptops, cell phones, and personal digital assistants. Power management is also advantageous for server deployments (e.g., server farms and data centers), as well as for desktop computers.

A standard for power management for microprocessor and computer systems is the Advanced. Configuration and Power Interface (ACPI), which is an open industry specification co-developed by Hewlett-Packard®, Intel®, Microsoft®, Phoenix®, and Toshiba®. ACPI establishes industry-standard interfaces enabling OS-directed configuration, power management, and thermal management of mobile, desktop, and server platforms. When first published in 1996, ACPI evolved an existing collection of power management BIOS code, Advanced Power Management (APM) application programming interfaces (APIs), PNPBIOS APIs, and Multiprocessor Specification (MPS) tables into a well-defined power management and configuration interface specification. The ACPI specification enables new power management technologies to evolve independently in operating systems and hardware while ensuring that they continue to work together.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 4a-4c illustrate a first example of dynamic reconfiguration of interrupt vectors under which interrupt vectors are remapped away from a first processor core;

FIGS. 5a-5c illustrate a second example of dynamic reconfiguration of interrupt vectors under which interrupt vectors are remapped away from a first processor core;

FIGS. 6a-6c illustrate a third example of dynamic reconfiguration of interrupt vectors under which a first core is returned to an active state and interrupt vectors are remapped to effect load balancing across all active cores;

FIGS. 7a-7c illustrate a fourth example of dynamic reconfiguration of interrupt vectors under which a first core is returned to an active state and interrupt vectors are remapped to effect load balancing across all active cores;

FIGS. 8a-8c illustrate a fifth example of dynamic reconfiguration of interrupt vectors corresponding to an interrupt fan in sequence under which interrupt vectors are collapse onto fewer cores to enable cores to be put into an idle state; and FIGS. 9a-9c illustrate a sixth example of dynamic reconfiguration of interrupt vectors corresponding to an interrupt fan out sequence under which interrupt vectors are remapped to newly available processor cores as those cores are returned from an idle state to an active state.

DESCRIPTION OF THE EMBODIMENTS

Figure 1:
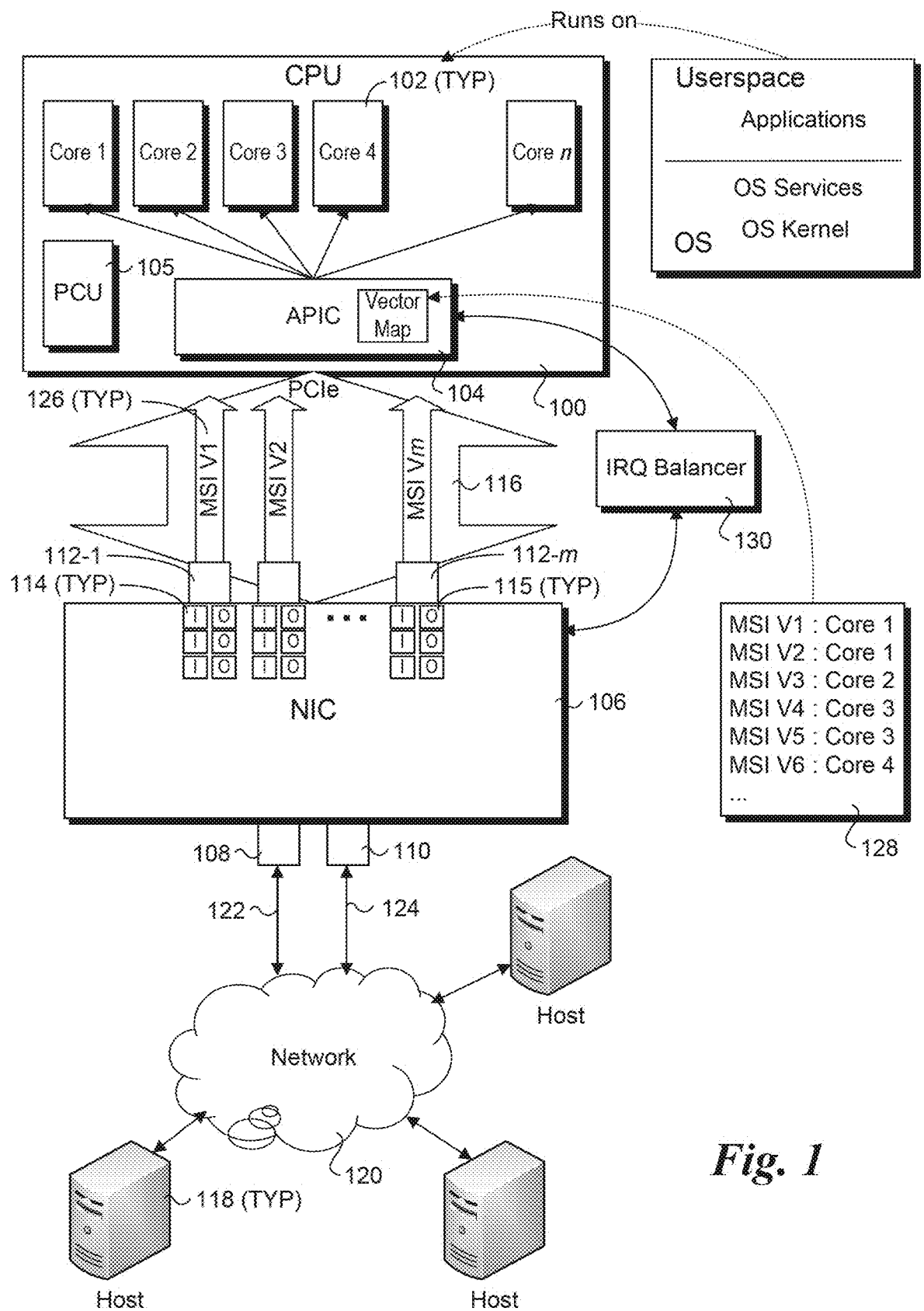
FIG. 1 is a schematic block diagram of a computer system configured to support dynamic reconfiguration of interrupts for effective power management, according to one embodiment.

Embodiments of methods, apparatus, and systems for implementing dynamic interrupt reconfiguration for effective power management are described herein. In the following description, numerous specific details are set forth (such as use of PCIe and MSI vectors) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment Furthermore, the particular features, structures, or characteristics may be combined in any suitable manner in one or more embodiments.

For clarity, individual components in the Figures herein mar also be referred to by their labels in the Figures, rather than by a particular reference number. Additionally, reference numbers referring to a particular type of component (as opposed to a particular component) may be shown with a reference number followed by "(TYP)" meaning "typical." It will be understood that the configuration of these components will be typical of similar components that may exist but are not shown in the drawing Figures for simplicity and clarity.

FIG. 1 shows a block-level diagram illustrating exemplary components for implementing dynamic interrupt reconfiguration for effective power management, according to one embodiment. An operating system (OS) and various applications and OS services are run on a CPU 100 including a plurality of processor cores 102 labeled core 1-*n*. In general, the number of cores a may range from 2 on upward, including but not limited to 2, 4, 6, 8, 10, 12, 16, 20, 24, 48, 64, 128, etc. CPU 100 also includes an APIC 104 and a Power Control Unit (PCU) 105. Toward the middle of the diagram is a NIC (Network Interface Controller) 106, including a pair of physical ports 108 and 110, and a plurality of logical ports 112-1-112-*m*, where m is 2048 or less in one embodiment. Each logical port has one or more associated input queues 114 and output queues 115. NIC 106 is linked in communication with CPU 100 via one or more PCIe links, which for illustrative purposes are shown as a single wide double-arrow 116. The one or more PCIe links may have variable lane widths in accordance with current and future PCIe specifications, such as but not limited to 1×, 2×, 4×, 8×, 16×, and 32×.

During operation, various applications and services establish connections with remote hosts 118 linked in communication with a network 120 via NIC 116 and over communication links 122 and 124. In general, network 120 is representative of various types of networks, including LANs, WANs, the Internet, and Intranets. Communication links 122 and 124 are representative of both wired and wireless links, including but not limited to Ethernet, 802.11x, WiMAX, and mobile data carrier links (e.g., data services running over GSM, UMTS, CDMA, WCDMA, LTE, etc.).

During runtime operations, various applications and OS services may establish network connections for various purposes, such as connecting to one of hosts 118. For example, an application such as a Web browser may open an HTTP connection with a host 118 comprising a Web server. Each connection to a host will be over a physical link and port and associated infrastructure. However, in order to support multiple concurrent communication links, NIC 106 and associated firmware and software resources supports dynamic allocation of virtual ports and queues, such that each physical link instance is associated with a corresponding virtual port and corresponding input and output queues. This is facilitated, in part, through use of PCIe, which employs packet-based messaging using various packet configurations that include source and destination addresses and payload data. Moreover, to support asynchronous operations and service requests related to NIC 106, PCIe employs MSI vectors to invoke corresponding processor interrupts, as depicted by MSI vectors 126, labeled MSI V1-*m* in FIG. 1. Each MSI vector comprises a PCIe message that includes applicable address information and header indicia that identify it as a MSI vector.

Coordination for mapping MSI vectors to appropriate processing resources is managed by the OS in coordination with APIC 104 and associated data structures and drivers. The OS is responsible for allocating processing threads to CPU resources that physically comprises CPU cores if running on the CPU hardware, or may comprises a virtual core or processor if running on a virtual machine hosted by a Virtual Machine Manager (VMM) or the like running on the CPU hardware. In some instances, physical cores are exposed to the OS as logical cores, such as if a CPU employs multi-threaded cores (e.g., Intel® CPU's supporting Hyper-threading®). For clarity and simplicity the allocation of physical cores are described herein; however, it will be recognized by those having skill in the art that similar techniques may be implemented with logical cores and VMM implementations.

Modern operating systems employ multi-threaded architectures, with one or more execution threads allocated to each application or service and assigned to a respective processor resource. The threads are executed on a processor core using a time-slicing scheme, wherein as given thread is allocated for execution for a corresponding time-slice, followed by a context switch and execution of another thread during a subsequent time-slice. This is continued on an ongoing basis.

For many years, processors employed a single processor core, and thus the threads of the multi-threaded OS would be allocated to only the single processor core. Some architectures also supported hardware signal-based. interrupts using interrupt pins (as well as more recent interrupt schemes such as MST and MST-x), under which an interrupt signal is invoked through use of an electrical signal on a physical CPU pin and the CPU hardware responds to the interrupt by scheduling service of the interrupt (or immediately services the interrupt if it is a non-maskable interrupt (NMI)) via hardware facilities in a manner independent of the OS.

The emergence of multi-core processors, APICs, and MSI/MSI-X introduced a new paradigm for handling interrupts. First, instead of allocating execution threads to a single processor core, the threads are allocated across multiple processor cores, typically using a round-robin allocation scheme or the like. This ensures the processor core usage is load-balanced, maximizing the processing throughput of the CPU. However, now that there are multiple execution units (i.e., the processor cores), there is more than a single execution unit that may he interrupted to service an interrupt. As a result, a mechanism is employed for mapping interrupt request to processor cores. This mechanism is effected via use of the APIC, which contains vector mapping information that maps each MSI vector to a corresponding processor core, as illustrated by APIC vector map 128 in FIG. 1. During ongoing operations, the vector map data is dynamically updated through use of au IRQ balancer 130, as explained in further detail below.

MSI/MSI-X interrupt requests (IRQs) are serviced in the following manner. First, a PCIe message is generated at a PCIe interface of the interrupt source device, which in the present example is NW 106. More particularly, the PCIe message is configured as an MST vector containing applicable address information, as well as a data payload containing data associated with servicing of the interrupt. The address information is used to identify the MST vector, which, in turn, is used to map the IRQ to the appropriate core for servicing.

In addition to mapping IRQs, the APIC also provides facilities for queuing and prioritizing IRQs for each processor core. As IRQs are received by APIC 104, they are mapped to appropriate processor cores and queued on a priority basis, such that each core has its own queue and responds to IRQs asynchronously with respect to IRQs for the other processing cores.

A significant advantage of multi-core processors is increased processor performance. Previous to the introduction of multi-core processors, CPU architectures were running into a performance wall, as the availability of reduced line widths using available fabrication technologies had substantially reached an end point, and increasing performance through higher clock rates presented physical limitations, such as exceeding signal skew limits and thermal limits. The use of multiple cores enabled processor throughput to be scaled without reducing line widths or increasing clock rates. However, since a greater portion of the processor circuitry is active When under typical CPU workloads, the multi-core processors consume more power and produce more heat than their uni-core counterparts. As a result, multi-core processors are often operated at lower clock frequencies (when compared with uni-core processors using similar manufacturing techniques) to reduce care and CPU die temperatures.

The multi-core aspect also presents an opportunity to reduce power by putting one or more cores into a reduced power or "idle" state. Typically, a multi-core CPU will include power management logic for effecting the power management state of each core. Depending on the aggressiveness of the operational mode, cores may be selectively "parked" or otherwise put in a reduced power state to reduce overall CPU power consumption (while also reducing heat generation and lowering the die temperature).

Intel® processors support four power management states for their microprocessor, CPU package, and overall system. TABLE 1 provides the various power management state names along with a brief description.

TABLE 1

| State | Description |
|---|---|
| P-State | Microprocessor Performance |
| T-State | Microprocessor Throttle |
| C-State | Microprocessor and Package |
| S-State | System Sleep States |

Microprocessor performance states (P-States) are a predefined set of frequency and voltage combinations at which the microprocessor can operate when the CPU is active. The microprocessor utilizes dynamic frequency scaling (DFS) and dynamic voltage scaling (DVS) to implement the various P-States supported by a microprocessor. DFS and DVS are techniques that dynamically changes the operating frequency and operating voltage of the microprocessor core based on current operating conditions. The current P-State of the microprocessor is determined by the operating system. The time required to change from one P-State to another is relatively short. The operating system takes this time into account when it dynamically changes P-States. The OS manages the tradeoff between power consumption by the microprocessor and the performance of the microprocessor.

A C-State is defined as an idle state. When nothing useful is being performed, various parts of the microprocessor can be powered down to save energy. There are three classifications of C-States: thread (logical) C-States, microprocessor core C-States, and microprocessor package C-States. Some aspects of all three categories of C-States are similar, since they all represent some form of an idle state of a processor thread, processor core, or processor package. However, the C-States are also different in substantial ways.

A thread (logical) C-State represents the operating system's view of the microprocessor's current C-States, at the thread level. When an application asks for a processor's core C-State, the application receives the C-State of a "logical core." A logical core is what an application's individual thread perceives to be a core, since the thread perceives to have full ownership of a particular core. As an example, for a CPU employing two logical cores per physical core (such as an Intel® CPU supporting Hyperthreading®), logical Core 0 (thread 0 executing on Core 0) can be in a specific idle state while logical Core 1 (thread 1 on Core 0) can be in another idle state. The operating system can request any C-State for a given thread.

A core C-State is a hardware-specific C-State. Under one embodiment, any core of the multi-core CPU residing on CPU package can be in a specific C-State. Therefore, all cores are not required to be in the same C-State. Core C-States are mutually exclusive per-core idle states.

A package C-state is an idle state that applies to all cores in a CPU package. The package C-State of the CPU is related to the individual core C-States. The CPU can only enter a low-power package C-State when all cores are ready to enter that same core C-State. Therefore, when all cores are ready to enter the same lower power core C-State, then the package can safely transition into the equivalent lower power package C-State.

In one embodiment, there are four C-States (idle states), including idle state C0, idle state C1, idle state C3, and idle state C6. The higher the C-State, the higher the level of idle and the greater the power savings, beginning with Idle State C0, Which corresponds to a normal active operational state for a core. For example, while in idle state C6, the core PLLs (Phase-Lock Loops) are turned off, the core caches are flushed and the core state is saved to the Last Level Cache (LLC). The power gate transistors are activated to reduce power consumption to a particular core to approximately zero Watts. A core in idle state C6 is considered an inactive core. The wakeup time for a core in idle state C6 is the longest. In response to a wakeup event, the core state is restored from the LLC, the core PLLs are re-locked, the power gates must be deactivated, and core clocks are turned back on.

Since C6 is the deepest C-State, the energy cost to transition to and from this state is the highest. Frequent transition in and out of deep C-States can result in a net energy loss. To prevent this, some embodiments include an auto-demote capability that uses intelligent heuristics to determine when idle period savings justify the energy cost of transitioning into a deep C-State and then transition back to C0. if there is not enough justification to transition to C6, the power management logic demotes the OS C-State request to C3.

Under current approaches, an OS is enabled to interface with power management facilities for a CPU using Operating System-directed Configuration and Power Management (OSPM), which describe a system implementing ACM and thus, removes device management away from the system. BIOS and places under control of the operating system. This enables the OS to (to a large degree) control the C-states of cores in a multi-core processor. Moreover, since the OS has control over execution thread-to-core allocations, the OS has the ability to coalesce execution threads onto fewer cores for greater power savings.

As discussed above, waking cores from C-States, particularly idle states C-3 and C-6, results in significant energy consumption. One operation that causes a core to wake is to handle an IRQ. As a result, when a core is employed for servicing IRQs, it cannot state in a low idle state and therefore consumes more power, even if it is only servicing IRQs intermittently.

In accordance with embodiments disclosed herein, this problem is addressed through use of novel components and data structures that enable interrupt vectors to be dynamically reconfigured by remapping them away from idle cores (or cores that are candidates for entering an idle state), thereby preventing the idle cores from having to service IRQs and enabling them to stay in deeper idle states without interruption. This results in the potential for significant power savings.

In one embodiment, interrupt vector remapping is effected via use of IRQ balancer 130. During system operation, IRQ balancer, in combination with an OS driver, operates as a bridge between the OS and APIC 104, enabling the OS or another software entity) to effect changes to vector map 128 through corresponding data. in a file or other data structure available to the OS. Logic in IRQ balancer is also implemented to support IRQ balancing, as well as intelligent remapping of interrupt vectors to support effective power management.

Figure 2:
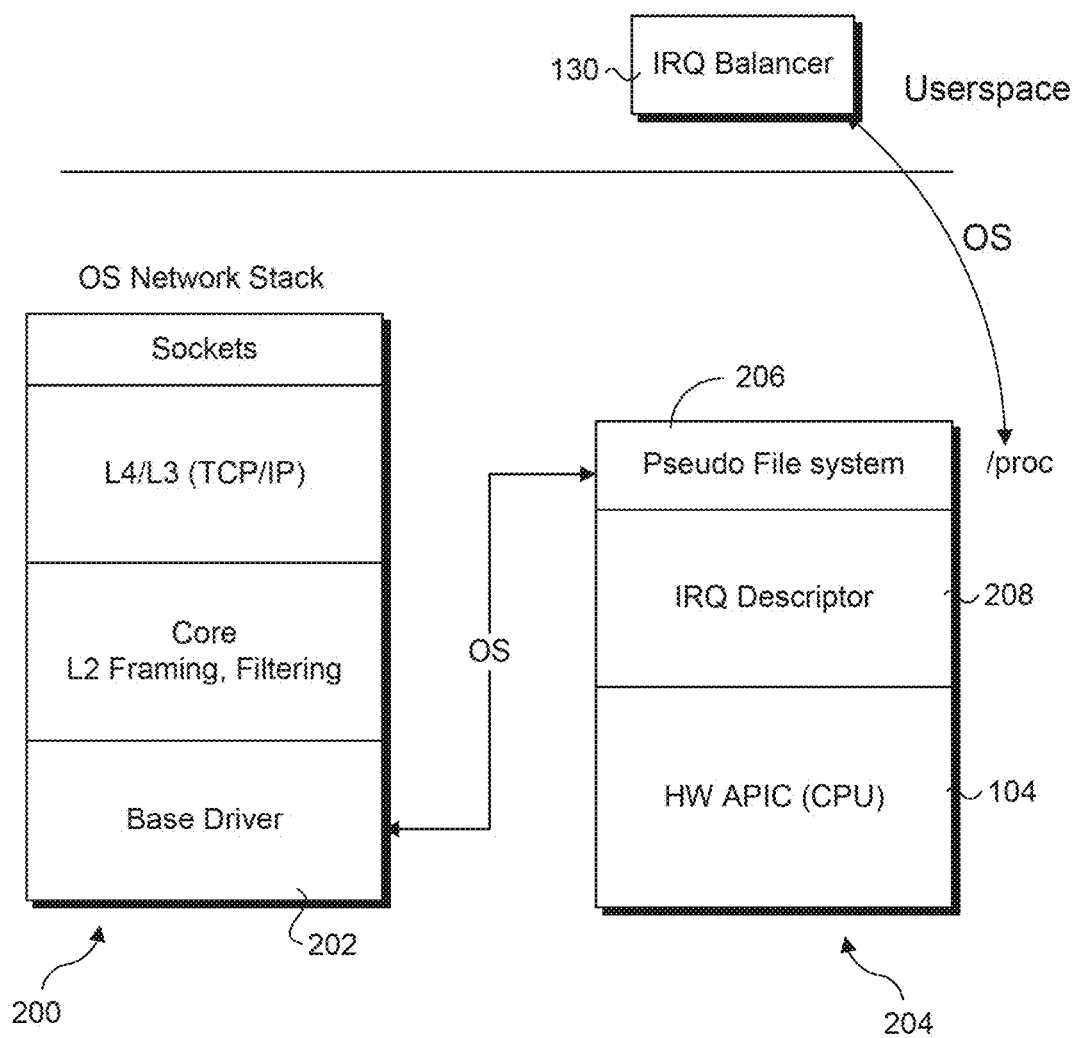
FIG. 2 is a block diagram depicting selective software components for effecting dynamic interrupt configuration and interrupt request balancing, according to one embodiment.

A block diagram illustrating selected components configured for use with an exemplary implementation of dynamic interrupt reconfiguration employing a Linux operating system is shown in FIG. 2. The diagram depicts selected components of an OS network stack 200, including sockets, Layer 4 and Layer 3 (L4/L3), a core networking layer including Layer 2 (L2) framing and filtering, and a base driver 202. As will be recognized by those skilled in the art, base driver 202 comprises an OS driver that is used as an abstracted interface between the OS stack and the underlying physical network hardware, which in this example corresponds to NIC 106. Toward the right side of the diagram is a stack 204 including a pseudo file system 206, an IRQ descriptor 206, and APIC 104. The diagram also includes IRQ balancer 130 operating in the OS userspace.

Figure 3:
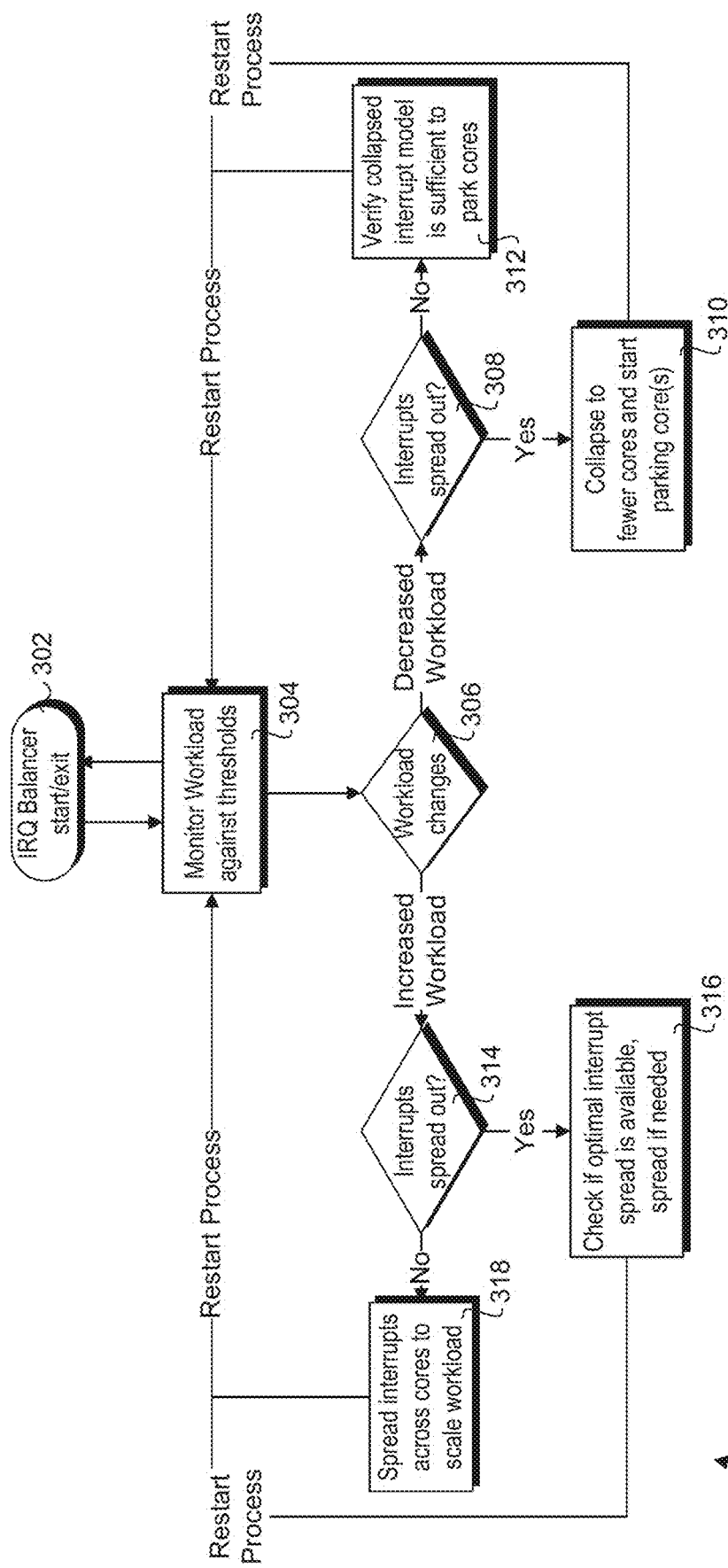
FIG. 3 is a flowchart illustrating operations and logic for implementing dynamic reconfiguration of interrupts for effective power management, according to one embodiment.

FIG. 3 shows a flowchart 300 depicting logic and operations for implementing aspects of IRQ balancer 130, according to one embodiment. At the top of the flowchart is an IRQ Balancer start/exit block 302. Upon being started, processor core interrupt workloads are monitored against predetermined or dynamically calculated thresholds in a block 304 to determine when a workload threshold is crossed. Various data for core workloads are typically maintained by the OS and/or CPU facilities. For example, modem operating systems typically keep statistics indicating core utilization, as well as the number of processes (i.e., execution threads) allocated to each core. In addition, CPU's that employ a PCU maintain a myriad of statistics on core utilization that are accessible to other system entities, including the OS.

In one embodiment, a threshold is based on an interrupt frequency, such as the frequency of IO (input/output) interrupts. This information may be readily monitored by the OS or a CPU component. Optionally, the core workload associated with responding to interrupts may be used as an interrupt workload threshold, or a weighted combination of interrupt frequency and interrupt core workload may be employed. In other embodiments, core utilization information is used either alone or in combination with interrupt frequency data for determining when workload thresholds are crossed. For instance, since an aspect of the power management techniques disclosed herein involve reconfiguring IRQ-to-core mappings to enable cores to be put into deeper C-States, it would make little sense to do so for a core that is currently being utilized at a significant level, since other system logic (such as employed by the PCU) will prevent the core from being put into the deeper C-State regardless of the number of interrupt vectors mapped to it. For example, a first core could be running a very compute-intensive application that does not have any associated IO (and thus no corresponding IO interrupts) and another background service with infrequent IO interrupts, while a second core could be hosting a Web service with a significant amount of network traffic and associated TO interrupts. In this instance, there would be no advantage in remapping the IRQs for the background service from the first core to the second core because the first core's level of utilization will prevent it from entering a deeper C-State.

When an interrupt workload threshold is crossed, the logic proceeds to a decision block 306 that determines whether the threshold corresponds to a workload increase or workload decrease. If there is a workload decrease, a determination is made in a block 308 to whether the CPU IO interrupt configuration is spread out amongst multiple cores. If it is, there is an opportunity to remap the IO interrupts for the core to one or more other cores, which in turn may enable the core to enter a deeper idle state. Accordingly, in a block 310 the interrupts are "collapsed" onto a fewer number of cores by remapping applicable MSI vectors, and a core "parking" process is started. Core parking is a common term used to indicate a core is being put into a deeper idle state (typically C-3 or C-6). If the interrupts are not currently spread out (meaning the IRQ-to-core mapping is already collapsed, at least to some degree), the logic proceeds to a block 312, wherein a verification is made to whether the collapsed interrupt model is sufficient to park one or more cores.

Returning to decision block 306, an interrupt workload increase corresponds to a. situation where processor utilization and/or IO interrupt activity has crossed a threshold going upward. In this case, it may be advantages to spread out or otherwise distribute the interrupts among the multiple cores. Accordingly, in a block 314 a determination is made to whether or not the current IRQ-to-core mapping is spread out. If the interrupts are already spread out, a check is made in a block 316 to determine if a more optimal spread configuration is available, and if so the IRQ core mappings are reconfigured for the more optimal spread configuration. Returning to decision block 314, if the interrupts are not currently spread out, the logic proceeds to a block 318 in which the IRQs are spread across applicable cores to scale the workload.

In one embodiment, core load balancing considerations are made such that the 10 interrupts assigned to each Core are balanced (at least to some degree). Accordingly, spreading out the interrupts using load balancing is referred to as "fanning out" the interrupts, while collapsing the interrupts to fewer cores is referred to as "fanning in" the interrupts. This is more easily understood through illustration, such as shown in FIGS. 4*a-c* through 9*a-c*.

In further detail, arrows are used in FIGS. 4*a-c* through 9*a-c* to illustrate MSI vectors, while the linetype of each arrow represents an interrupt frequency associated with that MSI vector. As illustrated, a solid line corresponds to a steady interrupt frequency, while a dashed line corresponds to an intermittent interrupt frequency and a dotted line corresponds to an infrequent interrupt frequency. A squiggle through an arrow means that MSI vector no longer exists (meaning the corresponding application or service for which a corresponding MSI vector was allocated has been stopped or is otherwise completed).

FIGS. 4*a-c* illustrate an example of an interrupt collapse and reconfiguration sequence. FIG. 4*a* shows an original configuration, under which three MSI vectors 126 are mapped to each of cores 1-4. The frequency of each of the MSI vectors is steady state, except for MSI vectors 126-1 and 126-2, which are infrequent. In one embodiment, workload thresholds are based on the frequency of the combined interrupts for each core, which may be determined by one of the methods described above using, e.g., a sliding average or similar technique. It is desirable to avoid performing reconfigurations too frequently, so some hysteresis may be built into the interrupt frequency calculation.

Suppose for exemplary purposes that the frequency threshold is equal to 1.1 and that a steady frequency MSI has a value of 1, an intermittent frequency is half of a steady frequency (value=0.5), while an infrequent frequency is one quarter of a steady frequency (value=0.25). In FIG. 4*b*, a threshold event is depicted under which the combined frequency of the interrupts is less than 1.1. As illustrated, an MSI vector 126-3 has been terminated, leaving a combined MSI vector interrupt frequency of MSI vectors 126-1 and 126-2 of 0.5. Accordingly, in response to the threshold condition, a vector collapsing and reconfiguration process is initiated, under which MSI vectors initially mapped to core 1 are remapped to other cores. In the illustrated example, MSI vector 126-1 is remapped to core 2, and MSI vector 126-2 is remapped to core 3. Once the MSI vectors are remapped away from core 1, operations are performed to determine whether core 1 is a candidate for parking, and if it is the core is parked by changing its idle C-State to a higher value (e.g., C-3 or C-6). in general, the determination of whether a core may be parked and what C-State may apply may be determined by the OS, by a PCU, or a combination of the two.

A second example of MSI vector collapsing and reconfiguration is depicted in FIGS. 5*a-c*. Under the original configuration shown in FIG. 5*a*, each of the four cores receives three MSI vectors, wherein all but an MSI vector 126-4 are steady state. As before, the threshold is set at 1.1. In FIG. 5*b*, a workload threshold event is depicted under which MSI vectors 126-5 and 126-6 are terminated. Accordingly, the remaining MSI vector frequency for core 1 is less than 1.1, setting up an MSI vector collapse and reconfiguration process, with the results shown in FIG. 5*c*. FIG. 5*c* also depicts a load balancing situation under which the remapped MSI vector 126-4 is selectively redirected to core 3, which previously had the lowest interrupt workload.

In addition to collapsing MSI vectors, reconfiguration operations can be performed to scale or "fan out" the MSI vectors such that the number of cores servicing the MSI vectors is increased when the number of available active cores increase (e.g., when idle cores are returned to active states). Two example of this process are shown in FIGS. 6*a-c* and FIGS. 7*a-c*.

Under an original configuration in FIG. 6*a*, core 1 is parked, while each of cores 2-4 receives three MSI vectors. The threshold in this example is 3, noting that a collapsing workload threshold and an expanding workload threshold do not need to match, and as discussed above, thresholds can be dynamically adjusted during ongoing operations (e.g., based on real-time workload measurements and/or other considerations). FIG. 6*b* also shows that core 1 is transitioned from a parked state to an active state. In accordance with a coordinated power management approach, MSI vectors are only mapped (whether due to an initial assignment or reconfiguration) to active cores. Also under the configuration shown in FIG. 6*b*, new MSI vectors 126-7 and 126-8 were assigned to core 2 and core 3 while core 1 was parked. Upon detection that core 1 has reentered an active state, core workload thresholds are restarted, leading to a determination that the interrupt frequency for each of cores 2 and 3 has exceeded their threshold of 3. As a result, a reconfiguration operation is performed, with the result shown in FIG. 6*c*. In this example a fan out of the MSI vectors is performed under which new MSI vectors 126-7 and 126-8 are remapped to core 1. This also rebalanced the MSI vector workload.

Under the example shown in FIGS. 7*a-c*, the initial configuration has two MSI vectors assigned to each of cores 2-4 with core 1 parked, as shown in FIG. 7*a*. As before, the threshold is 3. In FIG. 7*c*, core 4 has been assigned 3 new MSI vectors 126-2, 126-10, and 126-11 while core 1 was parked, after which core 1 is transitioned back to an active state. This restarts the workload threshold evaluation, which indicates that core 3 is overloaded while cores 1-3 may receive additional MSI vectors and core 1 presently has no MSI vectors assigned to it. As a result, a fan out and reconfiguration operation is performed, with the results shown in FIG. 7*c*. In this example, MSI vectors 126-9 and 126-10 are remapped to core 1, while MSI vector 126-11 is remapped to core 2. As before, this also effects a rebalancing of the MSI vector workload across all of the active cores.

FIGS. 8*a-c* shows a multiple reconfiguration process that results in collapsing MSI vector mapping from 4 to 2 cores, while FIGS. 9*a-c* shows a fan out sequence that begins with using a single core and ends with MSI vectors distributed across all four cores. FIGS. 8*b* and 8*c* respective show the vector configuration after a first reconfiguration under which core 1 is parked, and a second reconfiguration under which both cores 1 and 2 are parked. As before, during a fan out or "scaling" sequence, addition MBI vectors are received while one or more cores are parked, and upon availability of the additional codes rebalancing is performed. It is also noted that under a given ongoing configuration employing multiple active cores, new MSI vectors may be added to the existing active cores in a manner that maintains load balancing.

Embodiments of the present invention facilitate effective power management through dynamic reconfiguration of interrupt vectors in coordination with various system entities. During ongoing operations, interrupt vectors are mapped to various processor cores in a multi-core processor, and workloads on the processor cores are monitored. When an interrupt workload for a given processor core is detected to fall below a threshold for, that core is a candidate for putting into a deeper idle state, thus saving significant power. To facilitate this, the interrupt vectors are dynamically reconfigured by remapping interrupt vectors that are currently mapped to the processor core for which the workload threshold event is detected) to at least one other processor core, such that there are no interrupt vectors mapped to the processor core after reconfiguration. Thus, the processor core can be put into a deeper idle state and stay in that state without having to awake to service interrupt requests. Similar operations can be applied to additional processor cores, effecting a collapsing of interrupt vectors onto fewer processor cores, such as via an iterative process, leading to greater power savings.

In addition to collapsing interrupt vectors onto fewer cores, a scaling or "fan-out" operation can be used as processor cores are returned to an active state. For example, in response to a core returning to an active state, workload threshold detection operations are performed to determine whether a workload for a processor core is exceeded. For instance, the workload threshold may be based on an interrupt frequency that has been exceeded. In response to detection of this threshold event, interrupts from this core may be remapped to the core returning to the active state. At the same time, this reconfiguration effects a rebalancing of the interrupt vector assignments to the cores.

Aspects of the embodiments disclosed herein may be effected through execution of instructions on a CPU or virtual machine running on a CPU. Thus, embodiments of the invention may be used as or to support a instructions executed upon some form of processing core or otherwise implemented or realized upon or within a machine-readable medium, A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not he construed to limit the invention to the specific embodiments disclosed in the specification and the drawings. Rather, the scope of the invention is to be determined entirely by the following claims, which are to he construed in accordance with established doctrines of claim interpretation.

What is claimed is:

1. A method for configuring interrupts in a computer system employing a multi-core microprocessor having a central processing unit (CPU) with a plurality of processor cores comprising:
   mapping interrupt vectors to the plurality of processor cores in the CPU, each interrupt vector being mapped to a particular processor core;
   detecting that an interrupt workload of a first processor core has fallen below a threshold;
   and in response thereto,
   reconfiguring each of the interrupt vectors mapped to the first processor core to be remapped to a processor core other than the first processor core.

2. The method of claim 1, wherein reconfiguration of the interrupt vectors is effected, at least in part, through use of an operating system.

3. The method of claim 2, wherein the operating system is a Linux operating system.

4. The method of claim 2, wherein the operating system effects reconfiguration of the interrupt vectors through use of a device driver that interacts with an interrupt controller on the multi-core microprocessor.

5. The method of claim 4, wherein the device driver reads data in one of a configuration file or data structure accessed by the operating system.

6. The method of claim 1, further comprising load balancing interrupt vector assignments to the plurality of processor cores.

7. The method of claim 1, further comprising:
   detecting that an interrupt workload of a second processor core has fallen below a threshold;
   and in response thereto,
   reconfiguring each of the interrupt vectors mapped to the second processor core to be remapped to a processor core other than the first processor core and the second processor core.

8. The method of claim 7, wherein the second processor core is operating at a first operating state prior to the interrupt workload of the second processor core falling below the threshold, the method further comprising putting the second processor core into an idle state that is deeper than the first operating state after the interrupt vectors that were mapped to the second processor are reconfigured.

9. The method of claim 1, wherein the interrupt workload threshold is based on a level of interrupt frequency.

10. The method of claim 1, wherein the first processor core is operating at a first idle state prior to the workload of the first processor core falling below the threshold, the method further comprising putting the first processor core into a deeper idle state after the interrupt vectors that were mapped to the first processor are reconfigured.

11. The method of claim 10, further comprising:
   detecting that the first processor core has returned to the first idle state;
   detecting that an interrupt workload threshold on a third processor core has been exceeded;
   and in response thereto,
   remapping at least one interrupt vector from the third processor core to the first processor core.

12. The method of claim 11, further comprising, reconfiguring interrupt vectors by selectively remapping a portion of the interrupt vectors to other processor cores to effect interrupt vector load balancing.

13. The method of claim 11, further comprising dynamically adjusting at least one interrupt workload threshold.

14. The method of claim 11, wherein the interrupt workload threshold is based on an interrupt frequency.

15. The method of claim 1, wherein the interrupt vectors comprise Message-Signaled Interrupt (MSI) vectors.

16. The method of claim 1, wherein the interrupt vectors comprise input/output (TO) interrupt vectors generated by an IO device.

17. An apparatus comprising:
   a multi-core microprocessor having a central processing unit (CPU) including multiple processor cores;
   memory, operatively coupled to the multi-core microprocessor;
   a network interface controller (NIC), operatively coupled to the multi-core microprocessor;
   a storage device, having instructions stored therein configured to be executed by the multi-core microprocessor to cause the apparatus to perform operations including, mapping interrupt vectors to the plurality of processor cores, each interrupt vector being mapped to a particular processor core;

detecting that an interrupt workload of a first processor core has fallen below a threshold;

and in response thereto, reconfiguring each of the interrupt vectors mapped to the first processor core to be remapped to a processor core other than the first processor core.

18. The apparatus of claim 17, wherein at least a portion of the plurality of instructions comprise an operating system and reconfiguration of the interrupt vectors is effected, at least in part, through use of the operating system.

19. The apparatus of claim 17, wherein the operating system is a Linux operating system.

20. The apparatus of claim 17, wherein the multi-core microprocessor includes an interrupt controller, and wherein the operating system effects reconfiguration of the interrupt vectors through use of a device driver that interacts with the interrupt controller.

21. The apparatus of claim 17, wherein execution of the instructions cause the apparatus to perform further operations comprising load balancing interrupt vector assignments to the plurality of processor cores.

22. The apparatus of claim 17, wherein the interrupt vectors comprise Message-Signaled Interrupt (MSI) vectors generated by the NIC.

23. A tangible non-transient machine readable medium having a plurality of instructions stored thereon comprising an operating system configured to be executed on a multi-core microprocessor including a central processing unit (CPU) having a plurality of processor cores to cause an apparatus including the multi-core microprocessor to perform operations comprising:

mapping interrupt vectors to the plurality of processor cores in the CPU, each interrupt vector being mapped to a particular processor core;

detecting that an interrupt workload of a first processor core has fallen below a threshold;

and in response thereto, reconfiguring each of the interrupt vectors mapped to the first processor core to be remapped to a processor core other than the first processor core.

24. The tangible non-transient machine readable medium of claim 23, wherein the operating system is a Linux operating system.

25. The tangible non-transient machine readable medium of claim 23, wherein the operating system effects reconfiguration of the interrupt vectors through use of a device driver that interacts with an interrupt controller on the multi-core processor.

26. The tangible non-transient machine readable medium of claim 25, wherein the device driver reads data in one of a configuration file or data structure accessed by the operating system.

27. The tangible non-transient machine readable medium of claim 23, wherein execution of the instructions cause the apparatus to perform further operations comprising:

detecting that an interrupt workload of a second processor core has fallen below a threshold;

and in response thereto, reconfiguring each of the interrupt vectors mapped to the second processor core to be remapped to a processor core other than the first processor core and the second processor core.

28. The tangible non-transient machine readable medium of claim 27, wherein the second processor core is operating at a first operating state prior to the interrupt workload of the second processor core falling below the threshold, and wherein execution of the instructions cause the apparatus to perform further operations comprising putting the second processor core into an idle state that is deeper than the first operating state after the interrupt vectors that were mapped to the second processor are reconfigured.

29. The tangible non-transient machine readable medium of claim 23, wherein the apparatus includes a Network Interrupt Controller (NIC) and the interrupt vectors comprise Message-Signaled Interrupt (MSI) vectors generated by the NIC.

* * * * *